US005453902A

United States Patent [19]

Watanabe et al.

[11] Patent Number: 5,453,902

[45] Date of Patent: Sep. 26, 1995

[54] HEADLAMP HAVING IMPROVED MOUNTING OF INNER LENS

[75] Inventors: Shinji Watanabe; Kazushi Kawaguchi, both of Shizuoka, Japan

[73] Assignee: Koito Manufacturing Co., Ltd., Tokyo, Japan

[21] Appl. No.: 215,708

[22] Filed: Mar. 22, 1994

[30] Foreign Application Priority Data

Mar. 23, 1993 [JP] Japan .................................... 5-063590

[51] Int. Cl.$^{6}$ ........................................................ B60Q 1/00

[52] U.S. Cl. ............................ 362/61; 362/455; 362/310; 362/277; 362/307

[58] Field of Search ................................ 362/293, 61, 80, 362/455, 267, 457, 352, 320, 322, 277, 307; 359/818, 819

[56] References Cited

U.S. PATENT DOCUMENTS

| | | | |
|---|---|---|---|
| 2,668,903 | 2/1954 | Barcus | 362/61 X |
| 2,734,129 | 2/1956 | Kahla | 362/61 |
| 3,696,238 | 10/1972 | Szymanski | 362/293 |
| 4,249,232 | 2/1981 | Dick | 362/61 |
| 4,439,817 | 3/1984 | Aton | 362/310 X |
| 4,446,511 | 5/1984 | Sands | 362/61 X |
| 4,669,035 | 5/1987 | Hyde et al. | 362/457 X |
| 4,860,173 | 8/1989 | Jocher et al. | 362/61 |
| 4,937,710 | 6/1990 | Hurley et al. | 362/61 |
| 4,954,932 | 9/1990 | Isenga | 362/61 |
| 5,065,293 | 11/1991 | Mochizuki | 362/61 X |

FOREIGN PATENT DOCUMENTS

| | | | |
|---|---|---|---|
| 1430634 | 3/1969 | Germany | 362/455 |

*Primary Examiner*—Stephen F. Husar
*Assistant Examiner*—Thomas M. Sember
*Attorney, Agent, or Firm*—Sughrue, Mion, Zinn, Macpeak & Seas

[57] ABSTRACT

A headlamp for motor vehicles in which an inner lens formed with distribution beam control steps can easily be fastened to the front opening of the reflector. Holes, which receive respective protrusions protruding from the lower edge of the inner lens, are formed in the lower surface of the reflector, and cutout portions provided on the front end of the upper surface of the reflector are located further rearward than the protrusions, whereby the inner lens maintains engagement with the front opening of the reflector lens contact faces by its own weight. The upper edge of the inner lens can easily be fastened to the front end of the upper surface.

6 Claims, 6 Drawing Sheets

HEADLAMP HAVING IMPROVED MOUNTING OF INNER LENS

BACKGROUND OF THE INVENTION

The present invention relates to a headlamp for motor vehicles in which the distribution of light emitted from a light source and reflected forward by a reflector is controlled by distribution light beam control steps formed in an inner lens provided on the inner side of an outer lens. More particularly, the invention relates to a headlamp for motor vehicles having improved fastening of the inner lens to the front opening of the reflector.

FIG. 10 shows a conventional headlamp of the same general type to which the invention pertains. In FIG. 10, reference numeral 1 designates a lamp body having generally a capsule shape. A front lens 2 is mounted on the front opening of the lamp body 1, thereby forming a lamp chamber. A reflector 3, shaped as a paraboloid of revolution is disposed in the lamp chamber. A bulb 4 as a light source is mounted in the reflector 3. An inner lens 5 having distribution beam control steps S is mounted over the front opening of the reflector 3. A protruding part a protrudes from the bottom edge of the inner lens 5. A cutout b is formed in the top edge thereof. A hole c, associated with the protruding part a of the lens, is formed in the lower surface 3*a* of the reflector 3. A threaded hole e is formed in the lens abutting face d formed in the front end face of the upper surface 3*b* of the reflector 3.

To mount the inner lens 5 to the reflector 3, the protruding part a of the lens is fitted to the hole c of the lower surface 3*a* of the reflector, thereby positioning the lower edge of the inner lens. Then, the upper edge of the inner lens is brought into contact with the lens abutting face d of the reflector 3. Under this condition, a screw f is screwed into the threaded hole e.

A gap g has a size sufficient to allow smooth insertion of the protruding part a into the hole c. With this structure, if the protruding part a of the inner lens is merely inserted into the hole c of the reflector, the inner lens 5 is slanted as indicated by a phantom line in FIG. 11. Under this condition, it is impossible to keep the inner lens 5 in contact with the lens abutting face d. When the inner lens is attached with a screw, the inner lens 5 is pressed against the lens abutting face d with one hand, and the screw is screwed into the hole with the other hand. Thus, the work required for mounting the inner lens is difficult.

SUMMARY OF THE INVENTION

To overcome the problems of the conventional art, the present invention has as an object the provision of a headlamp for motor vehicles in which an inner lens having distribution beam control steps formed therein can easily be fastened to the front opening of a reflector.

To achieve the above and other objects, there is provided a headlamp for motor vehicles of a type in which an inner lens with distribution beam control steps is fastened to the front opening of a capsule-like reflector with a light source, characterized in that holes, which receive respective protrusions protruding from the lower edge of the inner lens, are formed in the lower surface of the reflector, and cutout portions provided on the front end of the upper surface of the reflector are located further rearward than the protrusions, whereby the upper edge of the inner lens is fastened to the front end of the upper surface of the reflector by means of screws or clips.

The inner lens contact face of the reflector is located further rearward than the positions where the protrusions of the lower edge of the inner lens are fitted into the cutout portions of the reflector. The inner lens maintains contact with the inner lens contact faces by its own weight. Accordingly, a worker can carry out the fastening work of the upper edge of the inner lens using both hands.

When clips are used for fastening the upper edge, the upper edge of the inner lens can be fastened to the front end of the upper surface of the outer lens using only a single motion.

DESCRIPTION OF THE PREFERRED EMBODIMENTS

Preferred embodiments of the present invention will be described with reference to the accompanying drawings.

Figure 1:
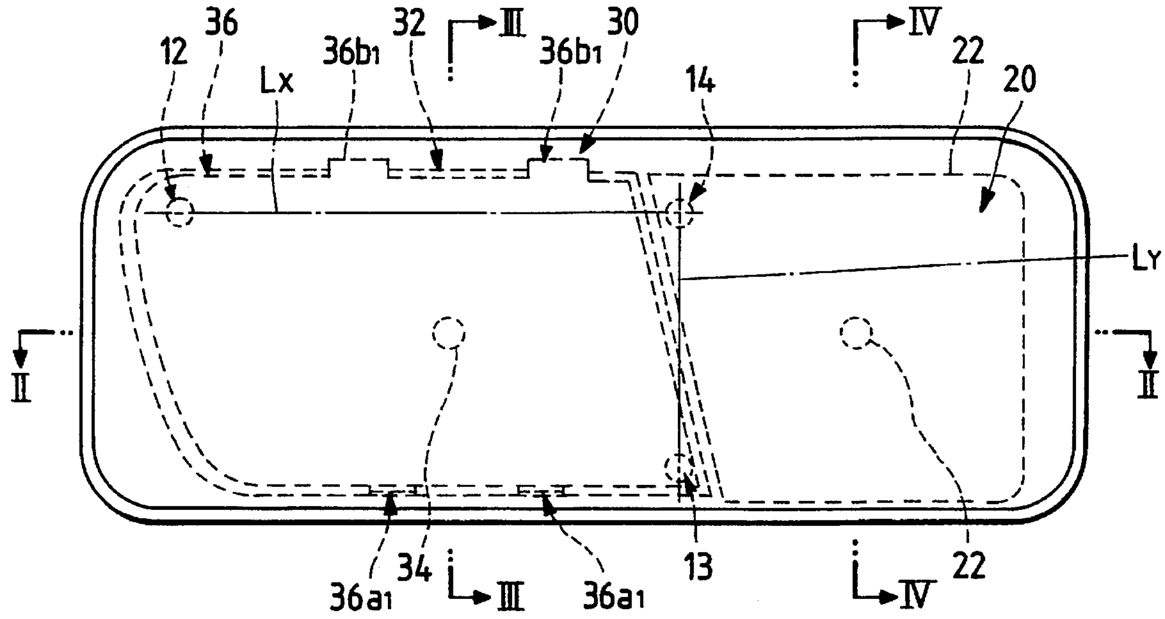
FIG. 1 is a front view showing a headlamp for motor vehicles constructed according to a preferred embodiment of the present invention.
Figure 2:
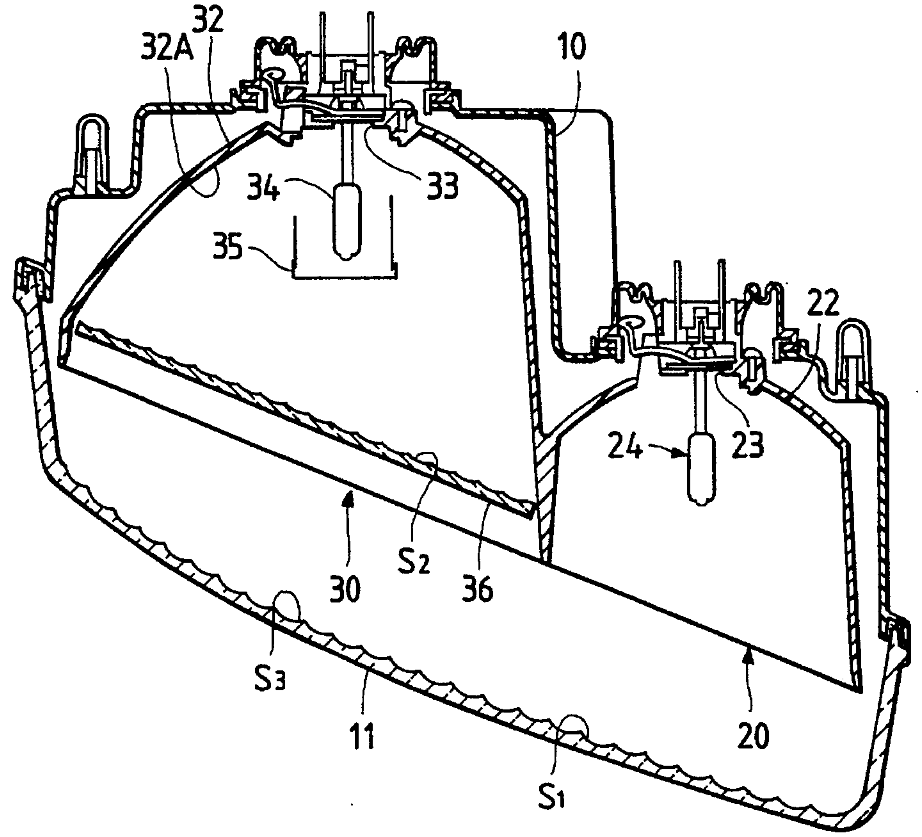
FIG. 2 is a horizontal sectional view (a cross-sectional view taken on line II—II in FIG. 1) of the headlamp of FIG. 1.
Figure 3:
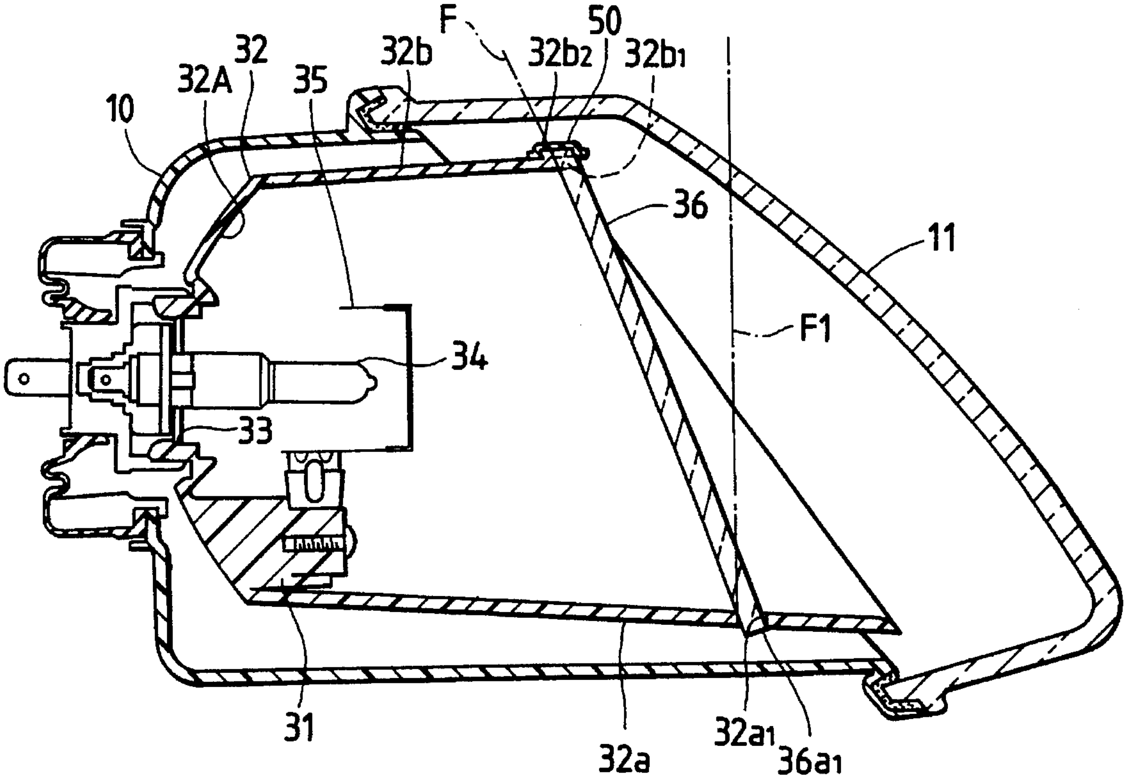
FIG. 3 is a longitudinal sectional view (a cross-sectional view taken on line III—III in FIG. 1) of the headlamp of FIG. 1.
Figure 4:
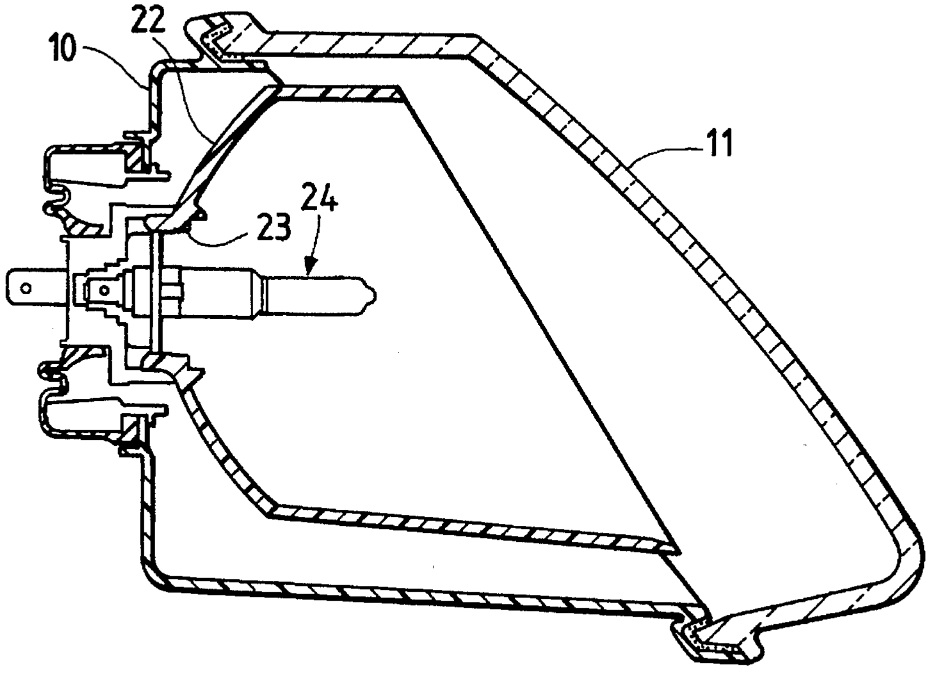
FIG. 4 is a longitudinal sectional view (a cross-sectional view taken on line IV—IV in FIG. 1) of the headlamp of FIG. 1.
Figure 5:
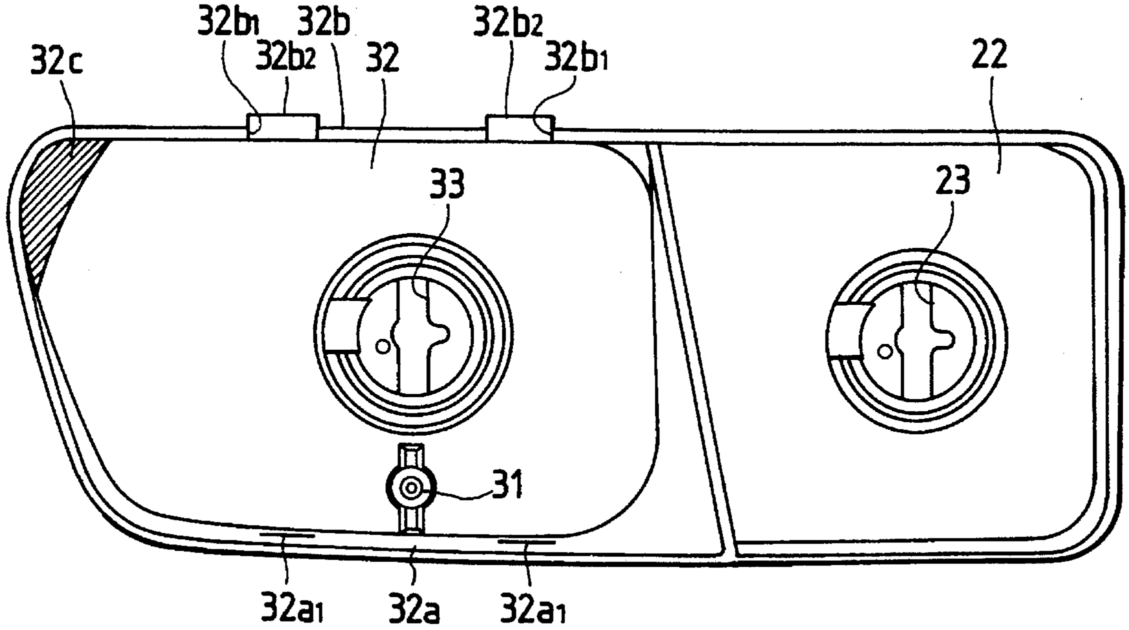
FIG. 5 is a front view showing the reflector of the headlamp of FIG. 1.
Figure 6:
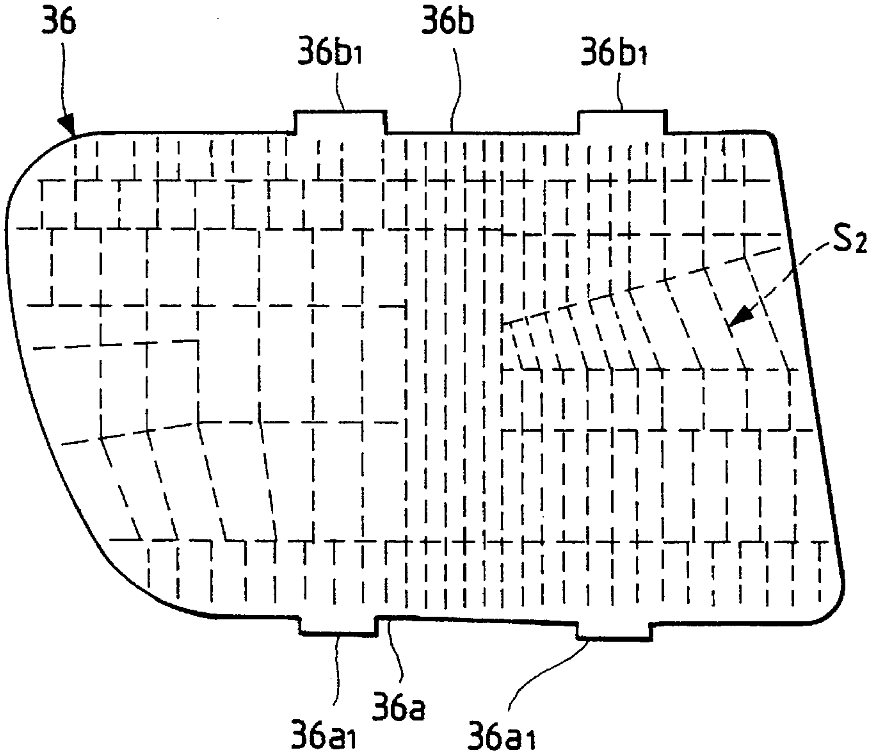
FIG. 6 is a front view showing the inner lens to be fastened to the front opening of the reflector.
Figure 7:
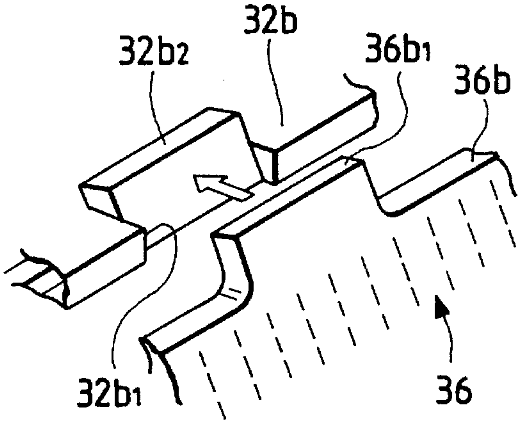
FIG. 7 is a perspective view showing a clip mounting portion between the upper edge of the inner lens and the front end of the upper surface of the reflector.

FIGS. 1 through 7 show a preferred embodiment of the invention, of which FIG. 1 is a front view showing a headlamp for motor vehicles according to the preferred embodiment of the present invention, FIG. 2 is a horizontal sectional view (a cross-sectional view taken on line II—II in FIG. 1) of the headlamp for motor vehicles of FIG. 1, FIG. 3 is a longitudinal sectional view (a cross-sectional view taken on line III—III in FIG. 1) of the headlamp of FIG. 1, FIG. 4 is a longitudinal sectional view (a cross-sectional view taken on line IV—IV in FIG. 1) of the headlamp, FIG. 5 is a front view showing the reflector, FIG. 6 is a front view showing the inner lens to be fastened to the front opening of the reflector, and FIG. 7 is a perspective view showing a clip mounting portion between the upper edge of the inner lens and the front end of the upper surface of the reflector.

In these figures, reference numeral 10 designates a lamp body, shaped like a capsule opened to the side. A transparent front lens 11 is mounted on the front opening of the lamp body 10, thereby forming a lamp chamber. A main beam lamp 20 includes a reflector 22 shaped as a paraboloid of revolution and a bulb 24 inserted into the bulb insertion hole 23 of the reflector 22. The light from the bulb 24 is reflected by the reflector 22 and collimated into a substantially parallel light beam, which is directed toward cylindrical steps S1, which act as distribution beam control steps, formed in the front lens 11. The light is there diffused into a desired distribution pattern to form a main headlamp beam.

A subbeam lamp 30 is composed of a reflector 32, a bulb 34, a shade 35, and an inner lens 36. The reflector 32 has a specially shaped reflecting surface composed of plural segmental areas. The directions of the reflecting light beams from the various segmental areas are different from one another. The bulb 34 is inserted into the bulb insertion hole 33 of the reflector 32. A shade 35 cuts off the light directed toward the areas of the reflector other than an effective reflecting surface 32A thereof. The shade 35, covering the bulb 34, is mounted protruding forwardly from the lower end of the bulb insertion hole 33 of the reflector 32 (FIGS. 3 and 5). The inner lens 36 for distribution beam control is disposed on the front side of the reflector 32. The light reflected by the effective reflecting surface 32A of the reflector 32 is formed into a substantially parallel light beam, which is directed forwardly. The parallel light beams are horizontally diffused by cylindrical steps $2 acting as distribution beam control steps and formed on the inner lens 36. The light beams are further horizontally diffused by other cylindrical steps $3, which are further distribution beam control steps, formed on the front lens 11, thereby forming a preset pattern of subbeam distribution.

When the main beam lamps 20 and 30 are simultaneously turned on, and the distribution beam patterns formed by these lamps are composed into a main beam. When the lamp 30 alone is turned on, a subbeam is formed. Where the main beam is formed by only the main beam lamp 20, the subbeam lamp 30 is used only for forming the subbeam.

The reflectors 22 and 32 are formed in a one-piece construction.

The reflectors are tiltably supported on the lamp body 10 by means of two forwardly extending aiming screws 12 and 13 rotatably supported on the rear surface of the lamp body 10, and a single ball joint 14. By turning the aiming screws 12 and 13, the reflectors 22 and 32 are tilted about the vertical axis $L_y$ and the horizontal axis $L_x$. With this structure, the optical axes of the lamps 20 and 30 are tilted for adjustment.

As shown in FIGS. 3 and 6, a pair of protrusions **36*a*1 and 36*a*1 protrude from the lower edge 36*a* of the inner lens 36. As shown in FIGS. 3 and 5, a pair of holes 32*a*1 and 32*a*1, which respectively correspond to the protrusions 36*a*1 and 36*a*1 of the inner lens, are formed in the lower surface 32*a* of the reflector 32. When the protrusions 36*a*1 and 36*a*1 are respectively fit into the holes 32*a*1 and 32*a*1, the lower edge 36*a* of the inner lens 36 is vertically and horizontally positioned and fastened to the to the reflector 32**.

The inner lens also has a pair of protruding portions **36*b*1 and 36*b*1 protruding from the upper edge 36*b* thereof. The front end of the upper surface 32*b* of the reflector, as shown in FIGS. 3 and 7, has a pair of paired cutout portions 32*b*1 and 32*b*1 corresponding to the protruding portions 36*b*1 and 36*b*1 of the inner lens and a pair of flanges 32*b*2 and 32*b*2 for providing inner lens contact faces. When the protruding portions 36*b*1 and 36*b*1 are respectively fitted into the cutout portions 32*b*1 and 32*b*1, the rear faces of the protruding portions 36*b*1 and 36*b*1 come into contact with the respective front faces of the flanges 32*b*2 and 32*b*2. The pairs of the protruding portions 36*b*1 and 36*b*1 with the flanges 32*b*2 and 32*b*2 are covered with clips 50. The upper edge 36*b* of the inner lens is fastened to the front end of the upper surface 32*b***.

As shown in FIG. 5, an inner lens contact face **32*c* (shaded), being flush with the front face of the flanges 32*b*2 and 32*b*2, is formed in the upper left corner of the reflector when viewed from the front. The upper edge of the inner lens is supported at three points, i.e., the inner lens contact face 32*c* and the couple of the flanges 32*b*2 and 32*b*2. The inner lens contact face 32*c* and the pair of flanges 32*b*2 and 32*b*2, which support the upper edge of the inner lens, are provided at a location further rearward than the holes 32*a*1 and 32*a*1. The inner lens 36** is smoothly inserted into the front opening of the reflector and fastened thereto in this state.

As shown in FIG. 3, the inner lens mounting plane F is greatly slanted rearwardly from the vertical plane F1. Accordingly, when the protrusions **36*a*1 and 36*a*1 of the lens lower edge are inserted into the holes 32*a*1 and 32*a*1 of the reflector and the inner lens 36 is placed on the lens contact face 32*c* side, the inner lens is tilted toward the rear side (in the direction of an arrow in FIG. 7) under its own weight. The protrusions 36*a*1 and 36*a*1 of the lower edge of the lens are horizontally positioned while being inserted into the holes 32*a*1 and 32*a*1 of the reflector lower surface. Therefore, the protruding portions 36*b*1 and 36*b*1 of the lens upper edge naturally engage the cutout portions 32*b*1 and 32*b*1 of the reflector front end. The inner lens 36 maintains engagement by its own weight. Therefore, if the worker removes his hand from the inner lens, the inner lens will not tilt and move apart from the front opening of the reflector, unlike the conventional headlamp. Accordingly, the worker can mount the clips 50 using both hands. The inner lens 36 thus can be fastened to the reflector 32** easily.

Figure 8:
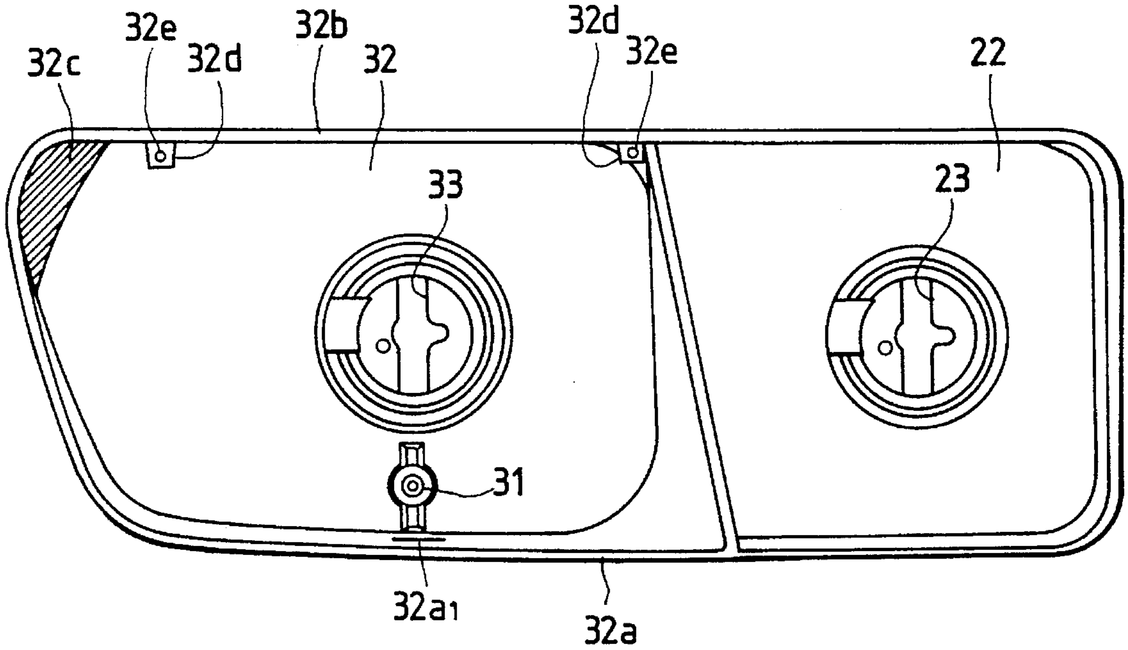
FIG. 8 is a front view showing a reflector installed within a lamp chamber of a headlamp.
Figure 9:
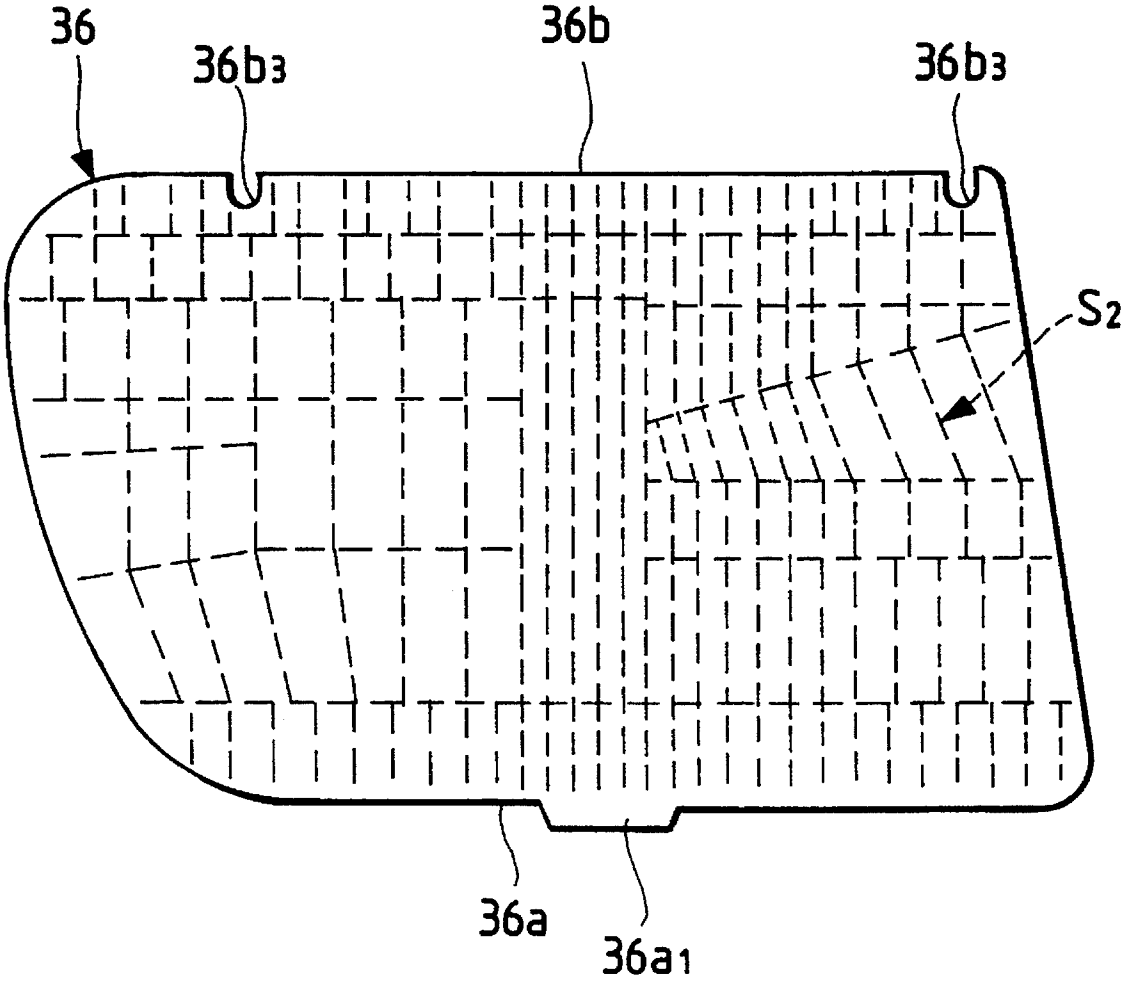
FIG. 9 is a front view showing the inner lens to be fastened to the front opening of the same reflector.
Figure 10:
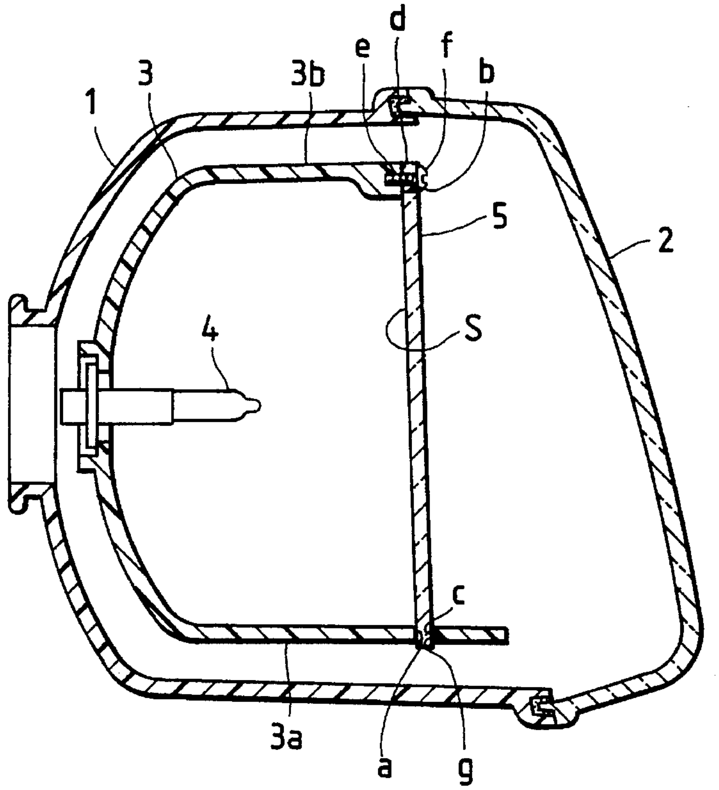
FIG. 10 PRIOR ART
FIG. 10 is a longitudinal sectional view showing a conventional headlamp for motor vehicles.
Figure 11:
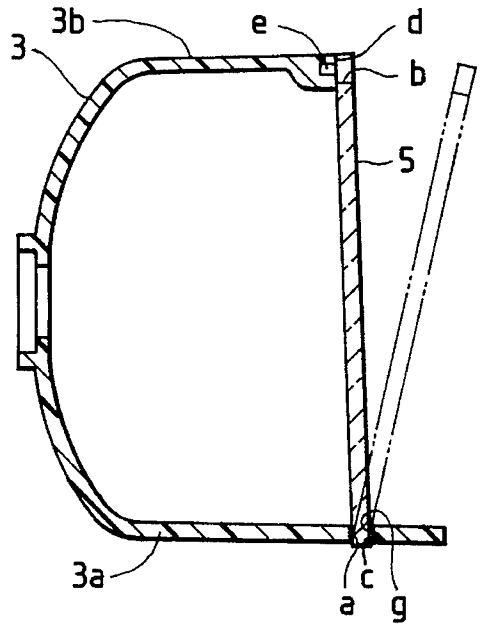
FIG. 11 PRIOR ART
FIG. 11 is an explanatory diagram for explaining the work required to fasten the inner lens to the front opening of the reflector.

In FIGS. 8 and 9, showing another embodiment of the present invention, FIG. 8 is a front view showing a reflector installed within a lamp chamber of a headlamp, and FIG. 9 is a front view showing the inner lens to be fastened to the front opening of the same reflector. In the first-described embodiment, the upper edge **36*b* of the inner lens is fastened by the clips 50, while in this embodiment, it is fastened by means of screws. As shown, two ribs 32*d* serving as lens contact faces are provided on the front end of the upper surface 32*b*. A-screw hole 32*e* is formed in the front end face (lens contact face) of each rib 32*d*. Cutout portions 36*b*3 and 32*b*3, which receive the screws, are formed in the upper edge 36*b* of the inner lens, located corresponding to the screw holes 32*e* and 32*e*. With this structure, the upper edge 36*b* of the inner lens is fastened to the front end of the upper surface of the reflector by means of the screws. The fastening structure of the upper edge 36*b* of the inner lens are similar to that of the conventional art of FIG. 10**.

The second embodiment differs from the first embodiment in that one protrusion **36*a*1 protrudes from the lower edge 36*a* of the inner lens, and one hole 32*a*1, which corresponds to the protrusion 36*a*1, is formed in the effective reflecting surface 32**A of the reflector. The remaining construction of this embodiment is the same as that of the first embodiment. Accordingly, like reference characters designate like portions, and a further description of such elements will be omitted.

In the embodiments described above, the reflectors are separate from the lamp body. It is evident, however, that the present invention is applicable for headlamps where the reflectors are integrally formed on the inner surface of the lamp body.

As seen from the foregoing description, in the headlamp for motor vehicles of the invention, when the protruding portions of the lens lower edge of the inner lens are inserted into the cutout portions of the lower surface of the reflector, and the upper edge of the inner lens is brought into contact with the inner lens contact faces of the reflector, the inner lens maintains engagement with the lens contact faces by its own weight. Accordingly, the worker can fasten the upper edge of the inner lens using both hands. Thus, the fastening work of the inner lens can be easily performed.

If clips are used for fastening the upper edge of the inner lens, the upper edge can be fastened simply, providing easier fastening work of the inner lens.

What is claimed is:

1. A headlamp for motor vehicles, comprising: an inner lens having distribution beam control steps formed therein and having a plurality of protrusions protruding from a lower edge thereof, a reflector, and a light source mounted in said reflector, said inner lens being fastened to a front opening of said reflector, wherein holes, which each receive one of said protrusions respectively, are provided in a lower surface of said reflector, and cutout portions are provided on a front end of an upper surface of said reflector located further rearward than said protrusions, an upper edge of said inner lens being fastened to said front end of said upper surface of said reflector, wherein said upper surface of said inner lens rests against said upper surface of said reflector under the weight of said inner lens.

2. The headlamp for motor vehicles of claim 1, wherein said upper edge of said inner lens is fastened to said front end of said upper surface of said reflector by screws.

3. The headlamp for motor vehicles of claim 1, wherein said upper edge of said inner lens is fastened to said front end of said upper surface of said reflector by clips.

4. A headlamp for motor vehicles, comprising: an inner lens having distribution beam control steps formed therein and having a protrusion protruding from a lower edge thereof, a reflector, and a light source mounted in said reflector, said inner lens being fastened to a front opening of said reflector, wherein a hole for receiving said protrusion is formed in a lower surface of said reflector in an effective reflecting area thereof, and cutout portions are provided on a front end of an upper surface of said reflector located further rearward than said protrusions, an upper edge of said inner lens being fastened to said front end of said upper surface of said reflector, wherein said upper surface of said inner rest against said upper surface of said reflector under the weight of said inner lens.

5. The headlamp for motor vehicles of claim 4, wherein said upper edge of said inner lens is fastened to said front end of said upper surface of said reflector by screws.

6. The headlamp for motor vehicles of claim 4, wherein said upper edge of said inner lens is fastened to said front end of said upper surface of said reflector by clips.

* * * * *